(12) United States Patent
Srivastav

(10) Patent No.: US 12,352,850 B1
(45) Date of Patent: Jul. 8, 2025

(54) GEO-LOCALIZATION USING 3D SENSOR DATA

(71) Applicant: Zoox, Inc., Foster City, CA (US)

(72) Inventor: Arvind Srivastav, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 413 days.

(21) Appl. No.: 17/855,245

(22) Filed: Jun. 30, 2022

(51) Int. Cl.
| | |
|---|---|
| *G01S 13/931* | (2020.01) |
| *B60W 50/00* | (2006.01) |
| *B60W 60/00* | (2020.01) |
| *G01S 13/89* | (2006.01) |
| *G01S 17/89* | (2020.01) |

(52) U.S. Cl.
CPC ....... *G01S 13/931* (2013.01); *B60W 50/0097* (2013.01); *B60W 60/00* (2020.02); *G01S 13/89* (2013.01); *G01S 17/89* (2013.01); *B60W 2050/0052* (2013.01); *B60W 2554/20* (2020.02); *B60W 2554/4026* (2020.02); *B60W 2554/4029* (2020.02)

(58) Field of Classification Search
CPC ........ G01S 13/931; G01S 13/89; G01S 17/89; B60W 60/00; B60W 50/0097; B60W 2554/20; B60W 2554/4026; B60W 2554/4029; B60W 2050/0052
See application file for complete search history.

(56) References Cited

U.S. PATENT DOCUMENTS

| | | | |
|---|---|---|---|
| 2018/0348781 A1* | 12/2018 | Zheng | G06V 10/774 |
| 2019/0080612 A1* | 3/2019 | Weissman | G01S 13/758 |
| 2020/0158862 A1* | 5/2020 | Mahmoud | G01S 13/931 |
| 2020/0286247 A1* | 9/2020 | Niesen | G06T 7/50 |

(Continued)

FOREIGN PATENT DOCUMENTS

| | | | | |
|---|---|---|---|---|
| GB | 2535211 A | * | 8/2016 | G06F 17/142 |

OTHER PUBLICATIONS

"Vision-Aided Navigation for GPS-Denied Environments Using Landmark Feature Identification.pdf", Dissertations and Theses, Dec. 2014, from https://core.ac.uk/download/217154678.pdf, (Year: 2014).*

(Continued)

*Primary Examiner* — Olumide Ajibade Akonai
*Assistant Examiner* — Yonghong Li
(74) *Attorney, Agent, or Firm* — Lee & Hayes, P.C.

(57) ABSTRACT

Geo-localization is the process by which an entity, such as an autonomous vehicle, can determine its precise location. In an example, a vehicle may include sensors, such as 4D radar sensors, that can capture a point cloud representing an environment within which the vehicle is positioned. An efficient representation of the point cloud is generated, which may be preceded by filtering the point cloud by removing points associated with transient elements. The efficient representation may be based on applying dimensionality reduction techniques to the point cloud or the filtered point cloud. The efficient representation may be compared with previously-generated representations which (Continued)

include geo-location, and were generated by the same dimensionality reduction techniques. Based on determining a match, the geo-location associated with the matched previously-generated representation may be assigned as a current geo-location of the vehicle.

20 Claims, 6 Drawing Sheets

(56) References Cited

U.S. PATENT DOCUMENTS

| | | | |
|---|---|---|---|
| 2022/0113394 A1* | 4/2022 | Shin | G06N 20/00 |
| 2022/0207883 A1* | 6/2022 | Watanabe | G05D 1/2464 |
| 2022/0270288 A1* | 8/2022 | Qu | G01S 17/931 |

OTHER PUBLICATIONS

Relationship between Cosine Similarity and Euclidean Distance _ Ajay Patel.pdf (Year: 2020).*

* cited by examiner

GEO-LOCALIZATION USING 3D SENSOR DATA

BACKGROUND

Geo-localization is the process by which an entity determines its precise geographic location in an environment. For example, an entity, such as a vehicle, can determine its relationship to elements on a map associated with the environment within which the entity is positioned by performing geo-localization. Conventional systems may rely on different types of data to determine the geo-location information of a vehicle. For example, global positioning system (GPS) data may be used to provide a current geo-location and/or LiDAR (Light Detection and Ranging) data may be used to detect features in the environment of the vehicle, which may be matched with features corresponding to a location in a geographic map of the environment. However, these conventional systems have known drawbacks. For example, GPS data may not be available or be unreliable in tunnels and urban environments with dense buildings. LiDAR data becomes unreliable in poor weather conditions, such as in fog or during precipitation, or in the presence of particulate matter, such as steam, dust, vehicle exhaust, and the like, and may not be usable for geo-localization due to large numbers of spurious data generated in such conditions. In addition, LiDAR data is high-dimensional, and requires excessive processing power and/or processing time to be effective in computing a current geo-location while the vehicle traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
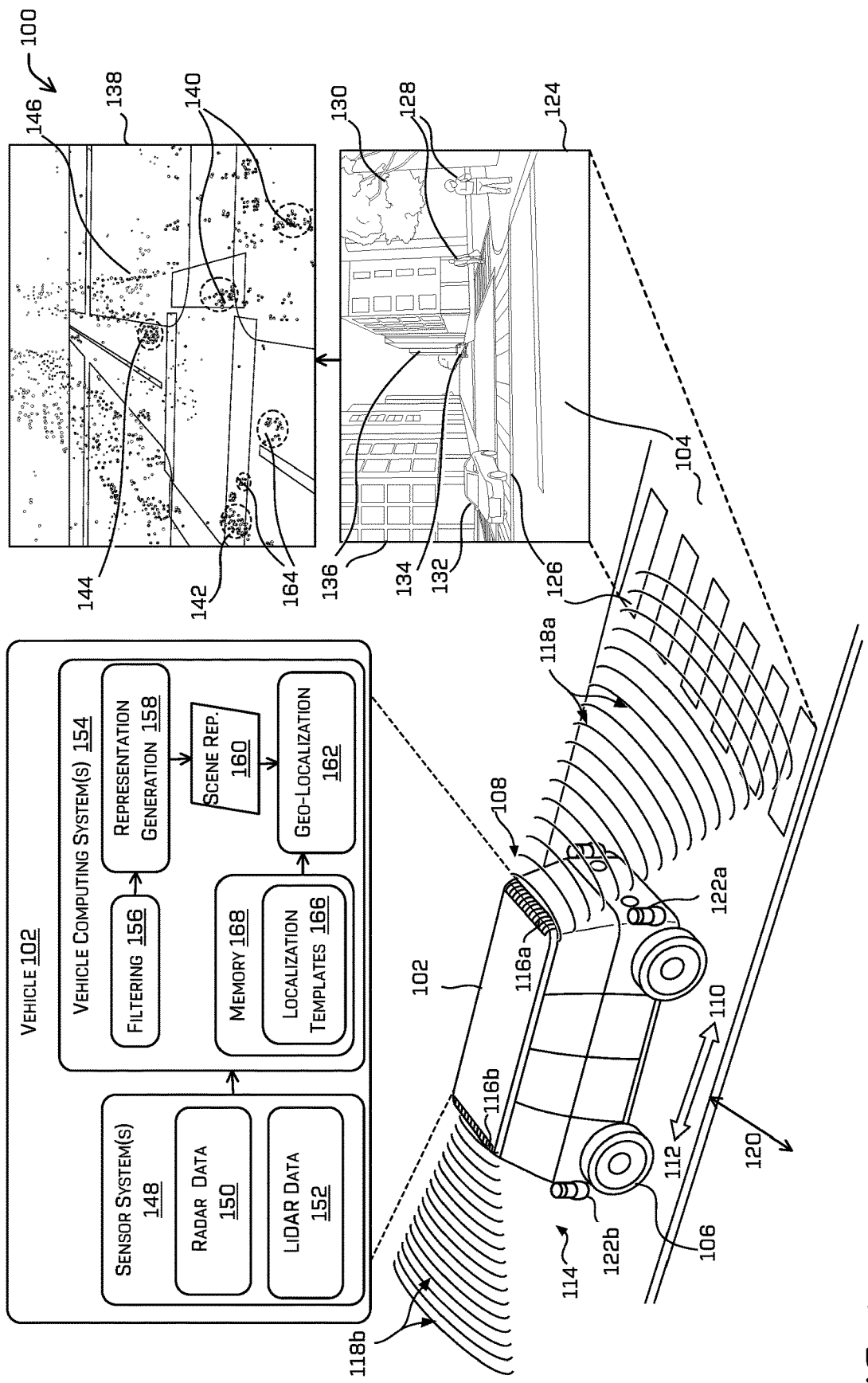
FIG. 1 illustrates an example environment that includes a vehicle implementing example systems and techniques for geo-localization using radar data, as described herein.

Techniques described herein are directed to determining geo-location of a vehicle, such as an autonomous vehicle, based on sensor data. In examples, computing systems of the vehicle may include various localization systems (e.g., localizers) corresponding to different sensor modalities, such as a LiDAR localizer, radar localizer, visual localizer, internal measurement unit (IMU) localizer, GPS localizer, and the like, as well as localization performed based on a combination of two or more of the sensor modalities. The localizers may process sensor data of particular modalit(ies) and determine a location of the vehicle, which may be a position of the vehicle and/or orientation of the vehicle (e.g., one or more of an x-position, y-position, z-position, roll, pitch, or yaw) in a coordinate system or with respect to a map of an environment in which the vehicle is operating. Some localizers may produce a geo-location of the vehicle (e.g., a geographical location) which may indicate a latitude/longitude or may be a position with respect to a map e.g., a GPS localizer outputs a current geo-location. As another example, a current geo-location of the vehicle may be determined from high-resolution data from LiDAR and/or radar sensors by detecting features of the environment in the high-resolution data, and matching the detected features with known features corresponding to a geo-location in a map of the environment.

Although many localization systems may benefit from the techniques described herein, an example system that implements the techniques described herein may include an autonomous vehicle equipped with radar sensors, such as 4D radar sensors, that capture a high-resolution point cloud of the environment, comprising three-dimensional data points along with associated information. An example 4D radar sensor system uses a multiple-input, multiple-output (MIMO) antenna array for high-resolution mapping of the environment, and utilizes time-of-flight information to output an elevation or height of data points, e.g., above road level or some reference (horizontal) plane, in addition to distance and azimuth information with respect to the sensor. 4D radar and LiDAR systems may also provide additional information, such as signal strength (e.g., a radar cross-section (RCS) value), signal-to-noise ratio (SNR), or velocity information (e.g., a velocity of each data point relative to the sensor). Whereas both 4D radar and LiDAR systems may produce similar data in clear weather conditions with good visibility, 4D radar systems have an additional advantage of producing reliable data in poor weather (e.g., rain, snow, sleet, and the like) and/or poor visibility (e.g., due to fog, smoke, and the like). Moreover, 4D radar systems may provide improved returns at farther ranges, compared to LiDAR systems.

In examples described herein, techniques implemented by vehicle computing systems may receive radar data captured by a scan of the environment by sensor system(s) carried by the vehicle. The radar data may comprise a three-dimensional (3D) point cloud, or 3D data in another form, representing a scene in the environment in which the vehicle is operating. The techniques described herein may determine points or blobs of points in the 3D point cloud that are associated with transient elements in the environment. Examples of transient elements include moving objects, such as other moving vehicles, bicycles, and pedestrians, temporarily motionless objects that are not a permanent part of the scene, temporary noise, and the like.

Various techniques may be used to associate points in the 3D point cloud to moving objects in the environment. For example, clustering techniques can be used to group points in the 3D point cloud according to any of the information associated with the points. By way of non-limiting example, points in a similar area, e.g., having close locational proximity, or points moving at the same velocity, may be candidates for clustering as being related to a single object.

In some examples, the vehicle computing systems may utilize techniques described in U.S. patent application Ser. No. 17/364,603, filed Jun. 30, 2021 and titled "Tracking Objects with Radar Data," for determining and/or tracking moving objects in the environment of the vehicle. The '603 application is hereby incorporated by reference in its entirety for all purposes.

In addition, transient elements may include objects that are not moving (e.g., motionless) when the image is captured, but are nevertheless not a permanent (e.g., time-invariant) part of the environment. Examples of such transient elements can include parked cars and bicycles, a person that is temporarily stationary, leaves on trees, or the like. In examples, a trained machine learning model may be used to detect transient elements, both moving and motionless, and associate points in the 3D point cloud with such transient elements. In examples, signal strength information and/or signal-to-noise ratio (SNR) of radar returns can be used an indication of a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. These features may be used to classify objects and determine if an object is likely to be a transient element e.g., not a part of the static portion of the environment.

Techniques described herein may filter out or remove points in the 3D point cloud that correspond to transient elements, both moving and motionless, to generate a filtered point cloud containing points that represent the time-invariant and/or static portion of the environment. For example, the filtered point cloud corresponding to the time-invariant portion of the environment may include points corresponding to permanent structures such as buildings, roads, traffic signs, benches, lamp-posts, tree trunks, and the like. In some examples, the techniques may further remove points likely to be associated with noise, based on semantic analysis of information associated with the points.

In some examples, the filtered point cloud may represent data accumulated over a duration of time, instead of an instantaneous snapshot. The duration of time may be small enough to prevent blurring, but long enough for integration of additional radar returns, and/or cancelation of noisy returns (e.g., between 1/30 second and 1 second). Such a filtered point cloud may provide a more accurate representation of the environment. Additionally, a more accurate representation of the environment may be obtained by using radar data that includes all data points, instead of using data points with high confidence levels only (e.g., high-fidelity observations).

In examples, the filtered point cloud is of high dimensionality (e.g., represented by a vector of high dimension, such as of the order of magnitude 106 to 109), such that data associated with the filtered point cloud would require large storage space, and further processing of such data would require high processing power and/or processing time. In some applications, high processing requirements may make such data inefficient and/or ineffective for geo-locating the vehicle in real- or near real-time as it traverses the environment. Instead, aspects of this disclosure may generate a storage-efficient representation of the filtered point cloud, which can be generated relatively quickly, and enable a fast comparison of the representation to previously-generated and stored representations to determine a match.

In examples, the techniques for generating the representation may include a dimensionality reduction step, wherein the filtered point cloud, which is high-dimensional, is projected onto a lower-dimensional subspace. Without limitation, in some implementations, a Johnson-Lindenstrauss Transform (JLT) technique is used for dimensionality reduction. The JLT technique projects high-dimensional data (e.g., the filtered point cloud) onto a lower-dimensional subspace described by a set of random basis vectors. In some examples, the techniques may include projecting the filtered point cloud onto multiple lower-dimensional subspaces, each described by a distinct set of random basis vectors. In such examples, the generated representation may include multiple sets of projected vectors, each corresponding to a set of basis vectors. The technique described herein for dimensionality reduction is fast and displays a number of beneficial properties, in addition to generating an efficient representation that is much smaller in size. For example, using the JLT technique approximately preserves, with high probability, pairwise distances observed in the high-dimensional data in the lower-dimensional representations of the high-dimensional data, resulting in a comparison of the representations yielding results similar to comparison of the corresponding high-dimensional data.

Implementations of this disclosure may maintain a library of previously-generated representations, associated with known geo-locations, as localization templates, e.g., stored in a database accessible by the vehicle computing systems. The library of localization templates may be generated using the techniques described above, using the same set of basis vectors for dimensionality reduction as used for generating the representation. The library of localization templates may be based on sensor data captured by a similar vehicle, where each localization template is associated with a known geo-location. For example, a data-collector vehicle may traverse environments where a vehicle (e.g., from a fleet of vehicles) may operate in the future, and generate representations of the environments for storing in the library as localization templates. The data-collector vehicle may tag each localization template with a geo-location obtained using instrumentation (e.g., a GPS unit), processing of sensor data, or through manual tagging if other methods are not effective e.g., inside a tunnel. The data-collector vehicle may be any vehicle of similar make/model as an operational vehicle, with sensors mounted in similar locations as the operational vehicle. In still further examples, the operational vehicle can collect sensor data used to generate the templates. Such an arrangement would ensure that features in the environment appear in similar positions in a scan of the environment, and representations generated during operation of the vehicle would be similar to representations (e.g., the localization templates) previously stored in the library for the same environment. In some implementations, there may be no separate data-collector vehicle, and the library of localization templates may be generated by vehicles traversing the environment during normal operations, for use by those or other vehicles in the future. For example, the library may be used for geo-location, by a vehicle operating in the future, when connection to GPS is lost due to a faulty GPS unit, or poor environmental conditions.

The techniques described herein may determine a match between the representation of the environment generated by the vehicle in operation, and a candidate localization template from the library of previously-generated localization templates. In examples, the match may be determined based on a distance between the representation and the candidate localization template being the smallest (e.g., using a nearest-neighbor search technique or approximations thereof). In some examples, the distance determined to be the smallest may be further compared with a threshold, and the match may be determined only if the distance is less than or equal to the threshold. In examples, the distance between representations may be determined using a number of techniques. In one non-limiting example, the distance may be computed as a cosine similarity between the representation and the candidate localization template(s).

In some examples, a subset of the localization templates in the library may be used to determine the match. For example, the subset may include only the localization templates associated with geo-locations that fall within a threshold radius of a target geo-location. In examples, the target geo-location may be based on a last-known geo-location of the vehicle, a current GPS location, or a predicted geo-location of the vehicle based on known vehicle velocity (e.g., speed and direction) and time elapsed since the previous successful geo-localization. In some examples, the subset may be retrieved from the library via a network connection and stored in on-board memory of the vehicle for further processing.

As discussed above, the localization templates stored in the library are each associated with a known geo-location, indicating the geo-location corresponding to the localization template e.g., the geo-location of the sensor(s) at the time of capture of the sensor data from which the localization template was generated. Based on determining a matching localization template with a representation generated by the vehicle, as described above, the techniques described herein may determine a current geo-location of the vehicle to be the geo-location associated with the matching localization template.

Precise geo-location of a vehicle, such as an autonomous vehicle, is useful for vehicle navigation. Conventionally, geo-location of a vehicle is determined based on geo-localization-specific vehicle instrumentation, such as GPS units and/or LiDAR systems. However, such instrumentation may not work reliably in urban environments with tall buildings, inside tunnels, under bridges and overpasses, underground parking areas, and the like. Techniques described herein are directed to leveraging sensor and perception data from other systems of the vehicle to enable the vehicle, such as an autonomous vehicle, to determine geo-location and navigate through the environment in these situations. As described, the techniques for determining geo-location are particularly applicable to sensor data from radar systems, such as 4D radar systems, or LiDAR systems. In good environmental conditions (e.g., clear weather with good visibility), LiDAR sensors may capture data points with high accuracy and density, resulting in accurate representation of a scene. In such conditions, implementations of this disclosure may use LiDAR data as input for geo-localization. However, unlike LiDAR data, sensor data generated by radar sensor system(s) may be more reliable in adverse atmospheric conditions e.g., presence of fog, precipitation, smoke, and the like, and radar data may be used as input for geo-localization under these conditions. In some implementations, the LiDAR data may be used as a primary or default input for geo-localization, and the radar data may be used in adverse conditions and/or in instances of malfunction of the LiDAR systems. Radar sensors may also have a greater range than other sensor modalities, so radar data may be useful to geo-localize relative to relatively farther objects. In examples, a LiDAR-based localization or other system may be evaluated via a confidence score. When the confidence score is below a threshold, a radar-based localization system may alternatively be used. In some examples, LiDAR, radar, or other localization techniques may be used simultaneously to improve localization wherein weightings are applied to each. The techniques described herein provide a technological improvement over existing geo-localization technology, particularly in challenging environments, such as tunnels, urban environments and in poor weather conditions, as discussed above. In addition, techniques described are much faster and more storage-efficient than conventional techniques utilizing matching features of sensor data and/or sensor fusion. The techniques described herein improve the accuracy of geo-localization, and can improve safety outcomes by, for example, enabling continued navigation to an intended destination in the presence of challenging environments where conventional GPS technology for geo-localization does not work reliably.

While this disclosure uses an autonomous vehicle in examples, techniques described herein are not limited to application in autonomous vehicles. For example, any system that uses sensor data to navigate an environment may benefit from the data processing techniques described. By way of non-limiting example, techniques described herein may be used on aircrafts, e.g., to identify precise location with respect to the environment on the ground when approaching or departing the airport in poor weather conditions. Moreover, non-autonomous vehicles could also benefit from techniques described herein, e.g., for presenting accurate navigation instructions to a driver of the vehicle in challenging environments.

FIGS. 1-6 provide additional details associated with techniques described herein. More specifically, FIG. 1 is a schematic illustration showing an example environment 100 in which the techniques discussed herein may be implemented. The example environment 100 shows a vehicle 102, which may be an autonomous vehicle, driving on a road surface 104. The vehicle 102 is transported by wheels 106 (the vehicle has four wheels, two of which are shown in FIG. 1). Although the example autonomous vehicle 102 has four wheels, the systems and methods described herein may be incorporated into vehicles having fewer or a greater number of wheels, and/or tracks. The example vehicle 102 may have four-wheel steering and may operate generally with equal performance characteristics in all directions. For example, a first end 108 of the vehicle 102 may be the front end of the vehicle 102 when traveling in a first direction 110, and the first end 108 may become the rear end of the vehicle 102 when traveling in the opposite, second direction 112, as shown in FIG. 1. Similarly, a second end 114 of the vehicle 102 may be the front end of the vehicle 102 when traveling in the second direction 112, and the second end 114 may become the rear end of the vehicle 102 when traveling in the first direction 110. These example characteristics may facilitate greater maneuverability, for example, in small spaces or crowded environments, such as parking lots and urban areas.

For illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time.

In such an example, since the vehicle 102 can be configured to control all functions from start to stop, including all parking functions, it can be unoccupied. Additional details associated with the vehicle 102 are described below. However, the vehicle 102 is merely an example, and the systems and methods described herein can be incorporated into any ground-borne, airborne, or waterborne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about the vehicle's location in an environment.

The vehicle 102 may include a plurality of sensors, including one or more radar sensors 116a arranged to propagate waves 118a generally in the first direction 110, and one or more radar sensors 116b arranged to propagate waves 118b generally in the second direction 112, opposite the first direction 110. In examples, the radar sensors 116a, 116b may be substantially identical, e.g., except for their position on the vehicle 102. In some examples, the vehicle 102 may include one or more additional radar sensors (not shown), which may be substantially identical to the sensors 116a, 116b, and arranged to propagate waves in directions 120 substantially perpendicular to the first direction 110 and the second direction 112. In other examples, however, the radar sensors 116a, 116b and the additional sensors may be differently positioned on the vehicle 102. In some examples, the arrangement of the sensors 116a, 116b and any additional radar sensors may enable a 360-degree field-of-view around the vehicle 102. The radar sensors 116a, 116b may emit the radio waves 118a, 118b and generate a radar scan (which may include a collection of a number of measurements of radar returns as data points) of a portion of the environment 100 (e.g., a scene) in the direction of wave propagation, based on time-of-flight measurements of reflected radio waves e.g., reflected off one or more surfaces in the environment. The radar sensors 116a, 116b may capture measurements that allow for computation of a vertical height (or elevation) of the radar returns, in addition to range, azimuth, and/or velocity measurements. For example, the radar sensors 116a, 116b and any additional radar sensors may comprise 4D radar sensors that may generate measurements of range or distances to the surface(s), velocities of the surface(s) relative to the sensors, angles with respect to a horizontal plane, and/or angles with respect to a vertical plane. Such measurements could be used to compute a three-dimensional (3D) representation, such as a 3D point cloud, of the scene.

Alternatively, or in addition, the vehicle 102 may include one or more LiDAR sensors 122a, 122b. The vehicle 102 may include additional LiDAR sensors (not shown) to cover a substantially 360-degree field-of-view around the vehicle 102. LiDAR sensors also produce a 3D point cloud of the environment based on time-of-flight measurements of reflected light to return to receiver(s) of the LiDAR sensors. While the techniques described herein are applicable to LiDAR sensor-generated point clouds, LiDAR sensors may produce noisy data in poor environmental conditions such as fog, smoke, rain, snow, and the like, due to backscattering of laser light pulses by atmospheric particles and water droplets. In contrast, radar sensors, such as 4D radar sensors, produce reliable data in all weather and environmental conditions, and, in some instances, at greater distances than LiDAR sensors. In some examples, the vehicle 102 may only be equipped with radar sensors, such as the sensors 116a, 116b, or only LiDAR sensors, such as the sensors 122a, 122b. Although two modalities of sensors 116, 122 are illustrated in FIG. 1, the vehicle 102 may include any number of additional sensors, with any number of different modalities. Without limitation, the additional sensors (not shown) may be one or more of inertial sensors (e.g., inertial measurement units, accelerometers, magnetometers, gyroscopes, etc.), imaging sensors (e.g., cameras), time-of-flight sensors, sonar sensors, thermal imaging sensors, or any other sensor modalities.

As illustrated, scene 124 represents a portion of the environment 100 in which the vehicle 102 is operating. The scene 124 includes various elements commonly encountered in an urban driving environment, such as crosswalk(s) 126, pedestrians 128, tree(s) 130, other moving vehicle(s) 132, parked vehicle(s) 134, buildings 136, and the like. As an example, the radar sensors 116a, 116b may generate a 3D point cloud 138 of the scene 124. The 3D point cloud 138 of the scene 124 illustrates blobs of points 140 corresponding to the pedestrians 128, a blob of points 142 corresponding to the moving vehicle 132, a blob of points 144 corresponding to the parked vehicle 134, and blobs of points 146 corresponding to the buildings 136 of the scene 124. The blobs of points 140, 142, 144, 146 may be clusters, groupings, or subsets to points in the 3D point cloud 138. As a note, road markings shown along with the point cloud 138 are not a part of the point cloud, and are provided for spatial reference only. In examples, the 3D point cloud 138 may be generated by aggregating reflected returns over a short time period (e.g., 1/30 seconds). In some examples, the 3D point cloud 138 may also include points generated by sensors of other modalities, or combination of modalities, carried by the vehicle 102. For example, the LiDAR sensors 122a, 122b may also capture a 3D point cloud, similar to the 3D point cloud 138, particularly in clear environmental conditions.

As illustrated in the block diagram accompanying FIG. 1, sensor system(s) 148 of the vehicle 102 may generate radar data 150, such as captured by the radar sensors 116a, 116b, and/or LiDAR data 152 captured by the LiDAR sensors 122a, 122b. The radar data 150 and the LiDAR data 152 may include measurements used to compute the 3D point cloud 138 (e.g., 3D position of points in a local or global coordinate system, including elevation or height), and information associated with the points in the 3D point cloud 138. For instance, the data 150, 152 may include diverse types of information, including but not limited to a velocity associated with each point in the 3D point cloud, signal strength of returns corresponding to each point, signal-to-noise ratio (SNR) corresponding to each point, and the like. In examples, data points associated with a SNR below a threshold level may be eliminated from the 3D point cloud. Additionally, the radar data 150 and/or the LiDAR data 152 may include a confidence score associated with the data, indicative of an accuracy of the data. For example, the confidence score may be based on functioning of the sensor (e.g., the confidence score may be lower if malfunction is detected), and/or on environmental conditions that may affect sensor performance (e.g., the confidence score of the LiDAR data 152 may be lower in adverse weather conditions). In some examples, a 3D point cloud may not be computed from the data 150, 152, and instead, raw data, compressed form, or a transformation of the data 150, 152 may be used in subsequent processing. The sensor systems 148 may provide the data 150, 152 to vehicle computing system(s) 154. The sensor systems 148 may provide the data 150, 152 continuously, or at discrete time intervals, while the vehicle 102 is operating. In some examples, the discrete time interval between providing the data 150, 152 may be based on a speed of the vehicle 102 e.g., the time interval may be smaller when the speed of the vehicle 102 is higher. In some examples, the sensor system(s) 148 may include fewer or additional sensor modalities than shown. Although point cloud is used as an example, radar and other data may be represented in other ways and still benefit from the teachings of this disclosure.

In examples described in detail herein, the radar data 150 and/or the LiDAR data 152 are used generally to determine a geo-location of the vehicle 102 e.g., a geographical location of the vehicle, which may be a position of the vehicle on a map of the environment 100 in which the vehicle 102 is operating. More specifically, FIG. 1 illustrates that the vehicle computing system(s) 154 of the vehicle 102 can include components for executing functionality associated with determining the geo-location (e.g., perform geo-localization) of the vehicle 102. In some implementations, the vehicle computing system(s) 154 may include a filtering component 156 to filter out or remove points associated with transient elements in the radar data 150 and/or the LiDAR data 152 e.g., points associated with transient objects, sensor noise, environmental artifacts, and the like. The vehicle computing system(s) 154 may also include a representation generation component 158 to generate a scene representation 160, and a geo-localization component 162 to determine the geo-location of the vehicle 102, as described in further detail herein. In an example implementation, the sensor systems 148 of the vehicle 102 may capture the 3D point cloud data 138 corresponding to a current scene, e.g., the scene 124, which is provided as input to the filtering component 156 to generate filtered data corresponding to the scene 124, which, in turn, is provided as input to the representation generation component 158 to generate the scene representation 160 of the scene 124 captured in the data 150, 152.

The filtering component 156 of the vehicle computing system(s) 154 generally implements functionality to receive the radar data 150 and/or LiDAR data 152, such as the 3D point cloud 138, and remove or filter out data associated with transient elements in the scene 124 e.g., not associated with permanent structures in the scene 124. Examples of transient elements may include moving objects, such as other moving vehicles, pedestrians, bicycles, and the like, as well as temporarily motionless objects e.g., parked cars and bicycles, a standing person, or even leaves on trees. For example, the filtering component 156 may identify the blobs of points 140 associated with the pedestrians 128, the blob of points 142 associated with the moving vehicle 132, and the blob of points 144 associated with the parked vehicle 134, as points corresponding to transient objects. In some examples, a multi-modality tracking component may be used to identify and/or track transient vs static/stationary objects such as described in U.S. patent application Ser. No. 16/866,865, filed May 5, 2020, U.S. Publication Number US20210237761, and titled "DEEP TRACKING NETWORK," the entirety of which is hereby incorporated by reference for all purposes.

The filtering component 156 may utilize various techniques to associate points in the 3D point cloud 138 to transient elements in the environment. By way of non-limiting example, clustering techniques can be used to group points in the 3D point cloud 138 according to any of the information associated with the points, or a combination thereof, such as points in a similar area (e.g., having close locational proximity), points moving at the same velocity, points with similar signal strength or SNR which may be associated with the same material type. In some examples, the filtering component 156 may utilize techniques described in U.S. patent application Ser. No. 17/364,603, filed Jun. 30, 2021 and titled "Tracking Objects with Radar Data," the entirety of which is hereby incorporated by reference for all purposes. Aspects of the system described in the '603 application include clustering points in radar data that are associated with various objects in the environment of the vehicle.

Alternatively, or in addition, the filtering component 156 may utilize machine learning model(s) configured to determine points corresponding to transient objects in 3D point clouds with associated information. For example, the filtering component 156 may provide the radar data 150 and/or the LiDAR data 152 as input data to the trained machine learning model(s) and/or other techniques that may identify points in the data corresponding to transient objects, as discussed herein. The filtering component 156 may receive, as an output of the machine learning model(s) or the other techniques, an indication of points in the input data that correspond to transient objects. In some examples, the filtering component 156 may utilize techniques described in U.S. patent application Ser. No. 16/587,605, filed Sep. 30, 2019 and titled "Perception System," for determining and/or tracking points corresponding to various objects in the environment of the vehicle, from a 3D point cloud representation of the environment. The '605 application is hereby incorporated by reference in its entirety for all purposes.

In examples, the machine learning model(s) may be trained using supervised learning techniques by utilizing training data-set(s) comprising 3D point clouds and associated information, where points or blobs of points are labeled with transient objects, where present, which may include both moving and motionless objects. In some examples, separate machine learning model(s) may be trained for each modality of sensors e.g., a first model for 4D radar data, a second model for LiDAR data etc. In other examples, the machine learning model(s) may be trained with a combination of data from different sensor modalities and determine the points associated with transient objects based on the combination (e.g., by utilizing sensor fusion). In examples, the machine learning model(s) may comprise neural networks or convolutional neural networks (CNNs). Additional examples of neural network architectures include ResNet50, ResNet101, VGG, DenseNet, PointNet, and the like. However, as described herein, machine learning can refer to a broad class of algorithms in which an output is generated based on learned parameters.

Further, the machine learning model(s) may determine a classification of the objects in the environment based on characteristics of the data 150, 152. For example, signal strength information and/or signal-to-noise ratio (SNR) of the returns can provide an indication of a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. These characteristics may be used to classify objects, and the classification may be used to determine if an object is likely to be a transient object.

Further, in examples, the filtering component 156 may identify additional points in the input data to remove. For example, the filtering component 156 may determine, based on a semantic analysis of the scene, points that are likely to be noise and/or unlikely to be associated with fixed objects in a scene. In some examples, the determination of the additional points may be based on their position in the scene (e.g., floating without connection to a ground surface or at a distance higher than a threshold distance), a height above the ground surface (e.g., on or very close to the ground surface), associated with vegetation, and the like. As an example, points in blobs 164 in the 3D point cloud 138 may be determined to be too close to the ground surface, and without connection to other structures, and therefore, the filtering component 156 may identify these points as the additional points to be removed. Accordingly, the filtering component 156 may remove the blobs of points 140, 142, 144, and 164 from the 3D point cloud 138 to generate a filtered 3D point cloud that is associated with a permanent or time-invariant portion of the environment. In some examples, the filtering component 156 may, instead, identify blobs of points associated with the permanent objects in the environment, using the same techniques described above, and generate the filtered 3D point cloud by keeping the blobs of points associated with the permanent objects, and removing points not included in the blobs of points associated with the permanent objects.

In examples, filtering component 156 may remove or filter out the points in the data 150, 152 identified as corresponding to transient elements, as discussed above. Accordingly, an output of the filtering component 156 may include filtered data containing a 3D point cloud corresponding to static and/or time-invariant portions of the environment 100 of the vehicle 102. The filtered data, which is high-dimensional (e.g., a vector $x \in \mathbb{R}^d$ where d is large), may require large storage space and manipulation of such data may require high computational power and/or time. Aspects of this disclosure provide improved functionality resulting at least in part from use of an efficient representation, such as the scene representation 160, according to the techniques detailed herein. In implementations of this disclosure, the vehicle computing system(s) 154 may utilize the representation generation component 158 to generate the scene representation 160 e.g., of the scene 124, that is smaller in size and computationally more efficient, while preserving characteristics that are unique to the scene 124. That is, the scene representation 160 is quickly-generated, and allows fast matching, while providing a reliable representation of the high-dimensional 3D point cloud 138, and therefore, of the underlying scene 124.

The representation generation component 158 may include functionality for receiving the filtered data from the filtering component 156, and generating the scene representation 160. In examples, generating the scene representation 160 may include a dimensionality reduction step, wherein the filtered data, which is high-dimensional, is projected onto a lower-dimensional subspace. As a note, as is known in art related to computer vision and machine learning, the term "dimension," as understood in the term "high-dimensional data," is not related to spatial dimensions, but instead to a number of data points (e.g., real numbers) needed to represent the data. For example, a 3D point cloud data has a spatial dimensionality of three, since each point can be represented as a triple, (x, y, z). However, the example 3D point cloud data may have a size (p, q, r) along x-, y-, and z-axes respectively, where p, q, and r refer to the number of data points along the respective axis. In this instance, computationally, the dimensionality of the 3D point cloud is three times the product of p, q, and r (e.g., the data can be represented by vector $x \in \mathbb{R}^{3pqr}$), since there are p×q×r points and each point is represented by three numbers corresponding to the triple (x, y, z).

In examples, the filtered data may comprise a vector $x \in \mathbb{R}^{3pqr}$ (e.g., a 3D point cloud of size (p, q, r)), whereas the scene representation 160 may comprise a projection of the filtered data onto a set of m linear basis vectors of size n each, resulting in m×n entries. In practice, p×q×r is much larger than m×n, and the reduction in size obtained may be of three or four orders of magnitude or higher, for example, from 109 to 105. Without limitation, in some implementations, Johnson-Lindenstrauss Transform (JLT) technique may be used for dimensionality reduction. The JLT technique projects high-dimensional data (e.g., the filtered data) onto a lower-dimensional subspace described by a set of random basis vectors. The JLT technique may be better suited for dimensionality reduction in the application described herein, because the JLT technique preserves key characteristics of original data (e.g., before the dimensionality reduction operation), such as preserving pairwise distances with high probability e.g., if a first 3D point cloud closely matches a second 3D point cloud (which may indicate that both point clouds were captured at the same scene), then a representation of the first 3D point cloud would closely match a representation of the second 3D point cloud. This feature enables use of comparisons between scene representations, which may be a lower-dimensional space than 3D point clouds, for finding a match between scenes, resulting in a large saving in both computational time and storage requirement. The order of magnitude of the reduction in size using the JLT technique is independent of the size of input data (e.g., the 3D point cloud size). Other dimensionality reduction techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)) may also be utilized instead of the JLT.

In some examples, the representation generation component 158 may project the filtered data onto a plurality of sets of random basis vectors. In such examples, the scene representation 160 may comprise a plurality of projections, each corresponding to a set of basis vectors used in the projection. Utilizing a plurality of projections may reduce ambiguity between representations of different scenes having similarity in features. The representation generation component 158 is discussed further with reference to FIG. 2 below.

The geo-localization component 162 may determine the geo-location of the vehicle 102, based at least in part on comparison of the scene representation 160 with previously-generated localization templates 166 stored in a memory 168 accessible by the vehicle computing system(s) 154. In example implementations of this disclosure, the memory 168 may store the previously-generated localization templates 166 along with a geo-location, corresponding to the geo-location of capture of underlying data. The localization templates 166 may comprise representations of the environment in which the vehicle 102 may travel, generated using the same processing steps as described above with respect to the generation of the scene representation 160. In particular, the same dimensionality reduction technique, using the same set of basis vectors, or the plurality of sets of basis vectors, can be used to generate both the localization templates 166 and the scene representation 160, however the localization templates 166 may be associated with respective known locations.

The localization templates 166 may be based on sensor data captured by a vehicle (e.g., a data-collector vehicle) similar to the vehicle 102. For example, the data-collector vehicle may be any vehicle of similar make/model as the vehicle 102, with sensors similar to the sensors 116a, 116b and/or 122*a*, 122*b* mounted at corresponding locations on the vehicle. Such an arrangement would ensure that 3D point clouds, such as the 3D point cloud 138, captured during operation of the vehicle 102, would have features in the scene, such as the scene 124, appear in similar positions as the 3D point clouds captured by the data-collector vehicle at the same scene. In addition, the localization templates 166 are generated from 3D point clouds captured by the data-collector vehicle using the same processing steps as the steps described in the generation of the scene representation 160, such as filtering using the filtering component 156 and representation generation using the representation generation component. In such an implementation, the scene representation 160 is expected to be substantially similar to the previously-generated and stored localization templates 166 for the same scene. Separate localization templates 166 may be generated and stored for each sensor modality (e.g., first localization templates generated from radar data for use with radar data 150, and second localization templates generated from LiDAR data for use with LiDAR data 152).

In examples, the data-collector vehicle may traverse environments where an operational vehicle, such as the vehicle 102, may operate in future, and capture sensor data, along with corresponding geo-locations. For example, the data-collector vehicle may tag the captured sensor data with a geo-location obtained using instrumentation (e.g., a GPS unit), or by other methods e.g., using cellular base station IDs, Wi-Fi positioning systems, Bluetooth beacons, manual tagging, and the like. The captured sensor data may be processed, either by vehicle computing systems of the data-collector vehicle, or by a remote computing system (e.g., a server), to generate representations of the environments. The generated representations are stored (e.g., on a remote memory accessible by the vehicle 102) as the localization templates 166, where each localization template is tagged with its geo-location, as described in further detail with reference to FIG. 3.

In some implementations, there may be no separate data-collector vehicle, and the localization templates 166 may be generated from sensor data captured by vehicles traversing the environment during normal operations, for use by other vehicles in the future. In such examples, geo-locations corresponding to the sensor data are also obtained and stored by the vehicle. As an example, geo-locations corresponding to the sensor data may be reliably computed using various means during clear weather conditions and stored, which may be used for geo-localization from radar data in inclement weather, using techniques described herein.

In some examples, the vehicle computing system(s) 154 of the vehicle 102 may access the stored localization templates 166 via a network connection. In other examples, a portion of the localization templates 166 (e.g., with geo-locations in a neighborhood of a current geo-location of the vehicle 102) may be downloaded into a local or on-board memory of the vehicle 102. The geo-localization component 162 may compare the scene representation 160 with the localization templates 166 to determine a matching localization template, based on a distance between the scene representation 160 and the matching localization template being the smallest among candidate localization templates (e.g., using a nearest-neighbor search technique). In other examples, alternatively or in addition, the matching localization template may be determined based on the distance between the scene representation 160 and the matching localization template being less than a threshold, or a similarity between the scene representation 160 and the matching localization template being higher than a threshold. For example, if the smallest distance among the candidate localization templates is less than or equal to the threshold, the candidate localization template with the smallest distance can be considered to match the scene representation 160, and the geo-location associated with the matched candidate localization template can be determined to be a current geo-location of the vehicle 102. In examples, the geo-localization component 162 may output the geo-location associated with the matching localization template as a current geo-location of the vehicle 102, and other vehicle components may utilize the outputted geo-location e.g., for path planning.

In examples, the geo-localization component 162 may only compute the distances from the scene representation 160 to a subset of the localization templates 166, and therefore, select a matching localization template (or determine there is no match) from among the subsets. Such an example could substantially reduce computational requirements for determining a matching localization template by limiting the number of distance computations required (e.g., only with the subset of localization templates). In some examples, the subset may include only the localization templates associated with geo-locations that fall within a threshold radius of a target geo-location.

For example, the target geo-location may be a last-known geo-location of the vehicle 102 (e.g., stored in a log file), or a predicted geo-location based on a known planned path of the vehicle 102, or based on known vehicle velocity (e.g., speed and direction) and time elapsed since the previous successful geo-localization (which may be based on the techniques described herein, or from a GPS unit or other localization systems of the vehicle 102). In some examples, the target geo-location may be a geo-location obtained from a GPS unit of the vehicle 102, which may be an approximate location due to conditions of the environment of the vehicle 102. The threshold radius may be determined such that the vehicle 102 is likely to be within the threshold radius of the target geo-location. In examples, the vehicle 102 may be traversing a geo-fenced area or an operational confines, and the subset of the localization templates 166 may include only the localization templates associated with geo-locations that fall within the geo-fenced area or the operational confines. As detailed further herein, particularly with reference to FIG. 2, the scene representation 160 may be compared with the subset of the localization templates 166 stored in the memory 168 to determine a distance between the scene representation 160, and each candidate localization template of the subset of the localization templates 166.

In instances where the geo-localization component 162 is unable to find a match among the localization templates 166 or the subset thereof (e.g., distances between the scene representation 160 and each of the localization templates 166 are higher than the threshold), the geo-localization component 162 may repeat the geo-localization process for a threshold amount of time, acquiring new sensor data until a matching localization template is found e.g., the sensor systems may have been temporarily obstructed by an object in the scene, or the vehicle 102 may move to a location where a matching localization template is found. Alternatively, or in addition, the geo-localization component 162 may expand the subset of the localization templates 166 that the scene representation 160 is being compared with e.g., by using a larger threshold radius. In some examples, a more computationally intensive geo-localization technique, such as feature matching directly in sensor data, may be employed when a match is not found using the scene representation 160.

In instances where a matching localization template is not found within the threshold amount of time, the geo-localization component 162 may indicate a failure to geo-localize. In some examples, another component (e.g., a planning component) of the vehicle computing system(s) 154 may determine an action for the vehicle to take when this indication is received, such as to take the geo-localization component 162 offline and use alternative navigation (e.g., using visual cameras), slow down or stop operation of the vehicle (e.g., pull over to the side of a road), and the like. In some examples, the geo-localization component 162 may save the scene representation 160 for which no match was found, along with associated data e.g., in a log file, for addition to the localization templates 166 and/or for debugging errors.

In examples, the geo-localization component 162 may determine the distance using a number of techniques and/or metrics. In one non-limiting example, the distance may be computed as a cosine similarity between the scene representation 160 and a candidate localization template of the localization templates 166. However, other distance metrics (e.g., Euclidean distance, Hamming distance, Manhattan distance, and the like), and other search techniques such as locality-sensitive hashing (LSH), may be utilized to determine a match. In examples where the scene representation 160 comprises projections on a plurality of sets of basis vectors, the distance may be a combination of distances (e.g., total distance, a maximum distance, a minimum distance, an average distance, a median distance, and the like), between each projection of the scene representation 160 and the corresponding projection of the candidate localization template on the same set of basis vectors.

Techniques described herein may improve accuracy of a planning system of the vehicle 102 and performance and/or safety outcomes of the vehicle 102 by determining and updating geo-location of the vehicle 102 using 3D sensor data. For instance, radar sensors, like the sensors 116a, 116b may generate data about objects that are relatively farther away than can be detected by imaging sensors, LiDAR sensors, or the like. Moreover, radar sensors may be more reliable in low-light situations, e.g., at night, and/or during certain atmospheric conditions, e.g., during rainy weather, foggy weather, snowy weather, or the like. However, in good environmental conditions (e.g., clear weather with good visibility), LiDAR sensors may capture data points with higher accuracy and density, resulting in a more accurate representation of the scene. In some examples, the vehicle computing system(s) 154 may use LiDAR data 152, or a combination of LiDAR data 152 with other modalities such as GPS, as default data for performing geo-localization in good environmental conditions. The vehicle computing system(s) 154 may switch to using radar data 150, if poor environmental conditions (e.g., rain, snow, sleet, fog, and the like) are detected which may be evaluated through use of a confidence score. In other examples, both radar data 150 and LiDAR data 152 may be used simultaneously for geo-localization, each of the data 150, 152 producing a corresponding geo-location. In such examples, the geo-location generated using the data 150, 152 of higher confidence score may be selected as a current geo-location of the vehicle 102. In yet another example, a geo-location obtained using the default data may be verified (e.g., intermittently, or when the confidence score of the default data is below a threshold) by computing a geo-location based on the radar data 150. For example, the LiDAR data 152 may have a confidence score below the threshold due to poor weather conditions or due to sensor malfunction, causing the vehicle computing system(s) 154 to switch to radar data 150, or use the radar data 150 to verify the geo-location obtained using the LiDAR data 152. In some examples, the LiDAR data 152 may be used with a distance constraint that may still be useful for localization in adverse environmental conditions, that may be fused with the radar data 150 to form a fused point cloud or other spatial representation.

Conventionally, however, despite these benefits of radar sensors, radar data has not been used for geo-localization, at least in part because conventional techniques based on comparing features in 3D point clouds require high computational power and/or processing time. Techniques described herein, however, generate an efficient representation, such as based on the JLT technique, and use the efficient representation for comparing a current scene representation with similarly-generated, previously-stored, localization templates of known geo-locations. As will be appreciated, the techniques described herein require much less computational power and/or processing time than conventional techniques. An example implementation of the representation generation component 158 and the geo-localization component 162 will be described in further detail with reference to FIG. 2.

Figure 2:
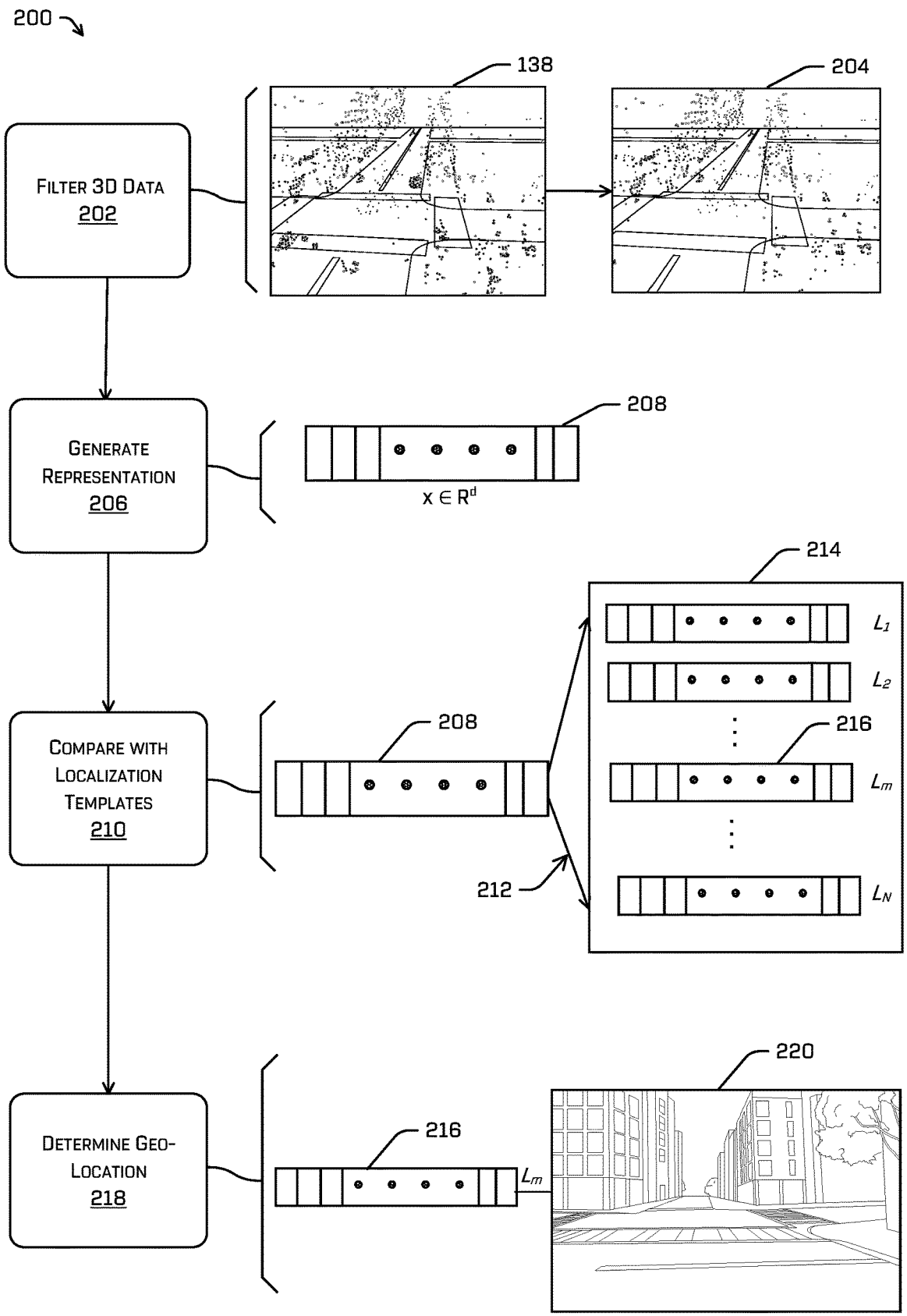
FIG. 2 includes textual and visual flowcharts to illustrate an example method for using radar data to perform geo-localization, as described herein.

FIG. 2 includes textual and visual flowcharts to illustrate an example process 200 for determining geo-location using three-dimensional sensor data e.g., 3D point cloud. In examples described herein, the sensor data may be obtained by radar sensors, such as 4D radar sensors, and/or LiDAR sensors disposed on an autonomous vehicle. In this example, the process 200 generates an efficient representation of the 3D data, compares the representation with previously generated representations stored as localization templates along with associated geo-locations, and determines a geo-location of the autonomous vehicle based on determining a matching localization template.

At an operation 202, the process 200 includes receiving 3D data, which may be based on radar data from 4D radar sensors or LiDAR data, and filtering out points corresponding to transient elements, such as moving objects, temporary objects, noise, and the like. An example accompanying the operation 202 illustrates the filtered 3D data 204 generated from the 3D point cloud data 138 of FIG. 1, by filtering out the blobs of points 140 associated with the pedestrians 128, the blob of points 142 associated with the moving vehicle 132, and the blob of points 144 associated with the parked vehicle 134, and blobs of points 164 associated with potential noise. The filtered 3D data 204 in the illustration may be obtained as an output of the filtering component 156, for example, when operating on the 3D point cloud data 138 captured by the radar sensors 116a, 116b, or the LiDAR sensors 122a, 122b of the vehicle 102 as shown in, and discussed in connection with FIG. 1.

At an operation 206, the process 200 includes generating a representation 208 of the filtered 3D data received at operation 202. As discussed with reference to FIG. 1, the representation 208 is an efficient, low-dimensional representation of the high-dimensional 3D data 204. As an example, the filtered 3D data 204 may comprise a vector x∈ $\mathbb{R}^{3pqr}$ (e.g., a 3D point cloud of size (p, q, r)), where p, q, and r refer to the number of data points along the x-, y-, and z-axes respectively. At the operation 206, the filtered 3D data 204 is projected on a set of random basis vectors of much smaller dimension (e.g., using the JLT technique), resulting in the representation 208, x∈ $\mathbb{R}^{d}$, where d<<pqr. In some examples, d (e.g., size of the JLT output vector) may be selected based on an error bound that can be tolerated during a subsequent matching step using the representation 208 (e.g., a higher value d may be selected for higher accuracy of matching). Though the representation 208 is illustrated as a 1-dimensional array, it is to be understood, that the representation 208 may be a multi-dimensional array. For example, the representation 208 may comprise a projection of the filtered 3D data 204 onto a set of m basis vectors of size n each, resulting in an m×n array of m rows and n columns. As is known in the art, the dimensionality of a vector of size m×n remains unchanged, from a point of view of computational complexity, in either a representation as an array of m rows and n columns, or as a linear array of size m×n.

At an operation 210, the process 200 includes comparing the representation 208 with localization templates that are previously generated and stored. As illustrated, localization templates 212 may be stored in a template library 214, which may be a database accessible to a processor implementing the process 200. As discussed with reference to FIG. 1, the localization templates 212 are generated using the same techniques as described herein at the operation 206. In particular, the same set of basis vectors is used to generate the localization templates 212 (e.g., by projecting previously captured filtered 3D data, which includes signal strength/SNR values at each data point, on the same set of basis vectors). At the operation 210, the representation 208 may be compared with the localization templates 212 of the template library 214 to determine a distance or a similarity between the representation 208 and each of the localization templates 212. In some examples, the localization templates 212 may only be a subset of localization templates that are stored in the template library 214, as discussed with reference to FIG. 1. As another example, the template library 214 may be configured for efficient searching of fixed-radius near neighbors, and may determine the localization templates 212 as being within a threshold distance of the representation 208, which is posed as a query. In some examples, the distance between the representation 208 and a candidate localization template of the localization templates 212 may be computed as a cosine similarity (e.g., which measures an angular distance between two vectors). A matching localization template 216 may be determined using nearest neighbor search techniques, such that the distance between the representation 208 and the matching localization template 216 is the smallest among distances computed between the representation 208 and each of the localization templates 212. In some examples, approximations of nearest neighbor search may be used to improve efficiency (e.g., reduce the number of distances to be computed) and reduce search time. For instance, locality-sensitive hashing (LSH) may be used to group the localization templates 214 into groups based on the distance metric. In another example, the template library may be represented as a proximity graph indicating templates that are spatially proximate, and a greedy search technique may be used to determine the matching localization template 216. Other search methods may include approximations of tree indexing structures, such as vector approximation files, and compression based searches.

At an operation 218, the process 200 includes determining geo-location corresponding to the filtered 3D data generated at the operation 202. As discussed with reference to FIG. 1, each localization template of the localization templates 212 is associated with a geo-location, where the geo-location indicates the location of capture of sensor data used to generate the localization template. The geo-location associated with the matching localization template 216 is accessed, and is determined to be the geo-location corresponding to the position of the sensor at which the filtered 3D data 204 is generated. The geo-location associated with the localization templates 212 may include a geographic location, which may be in a coordinate system, with reference to a map, or may include global positioning system (GPS) coordinates of the location. An example scene 220 accompanying the matching localization template 216 illustrates the scene corresponding to the matching localization template 216. As illustrated, the scene 220 corresponds to the scene 124 of FIG. 1, where the transient elements 128, 132, 134 have been filtered out. In some examples, the process 200 may include determining an amount and direction of shift needed in the matching localization template 216 to produce a higher similarity or a smaller distance value with the representation 208, and using the amount and direction of the shift to determine a more accurate geo-location at the operation 218. For example, the matching localization template 216 may have been generated from data gathered (e.g., by the data-collector vehicle) from a first lane of a multi-lane roadway. Whereas, the representation 208 may be generated by sensor data from the vehicle 102 traveling in a second lane, different from the first lane, of the same roadway, causing a shift in point-of-view in a horizontal direction. As a result, a higher similarity or a lower distance between the representation 208 and the matching localization template 216 may be obtained if the representation 208 or the matching localization template 216 is adjusted to account for the shift in point-of-view (e.g., shifting the point-of-view of the matching localization template 216 horizontally to obtain a more accurate representation of the scene as viewed from the second lane). When a higher similarity or a lower distance is obtained as a result of applying such a shift, the geo-location associated with the matching localization template 216 may also be adjusted by applying a corresponding shift, both in amount and direction, to obtain a more accurate geo-location of the vehicle 102.

From the foregoing description of FIG. 2, the process 200 can be used to update geo-location of the autonomous vehicle as it travels in an environment. The geo-location is determined based on matching an efficient representation of captured sensor data, which can be generated quickly (e.g., in real-time or near real-time), with similar representations of previously captured sensor data, after removal of transient elements. In contrast, conventional techniques required comparisons between features of sensor data, which is particularly time and processing intensive, and may not be possible to compute in real time. In implementations, the 3D data 204 may be captured by 4D radar sensors, which can gather reliable data in poor weather conditions and low light, and provides a three-dimensional point cloud of a scene, including a vertical height.

Figure 3:
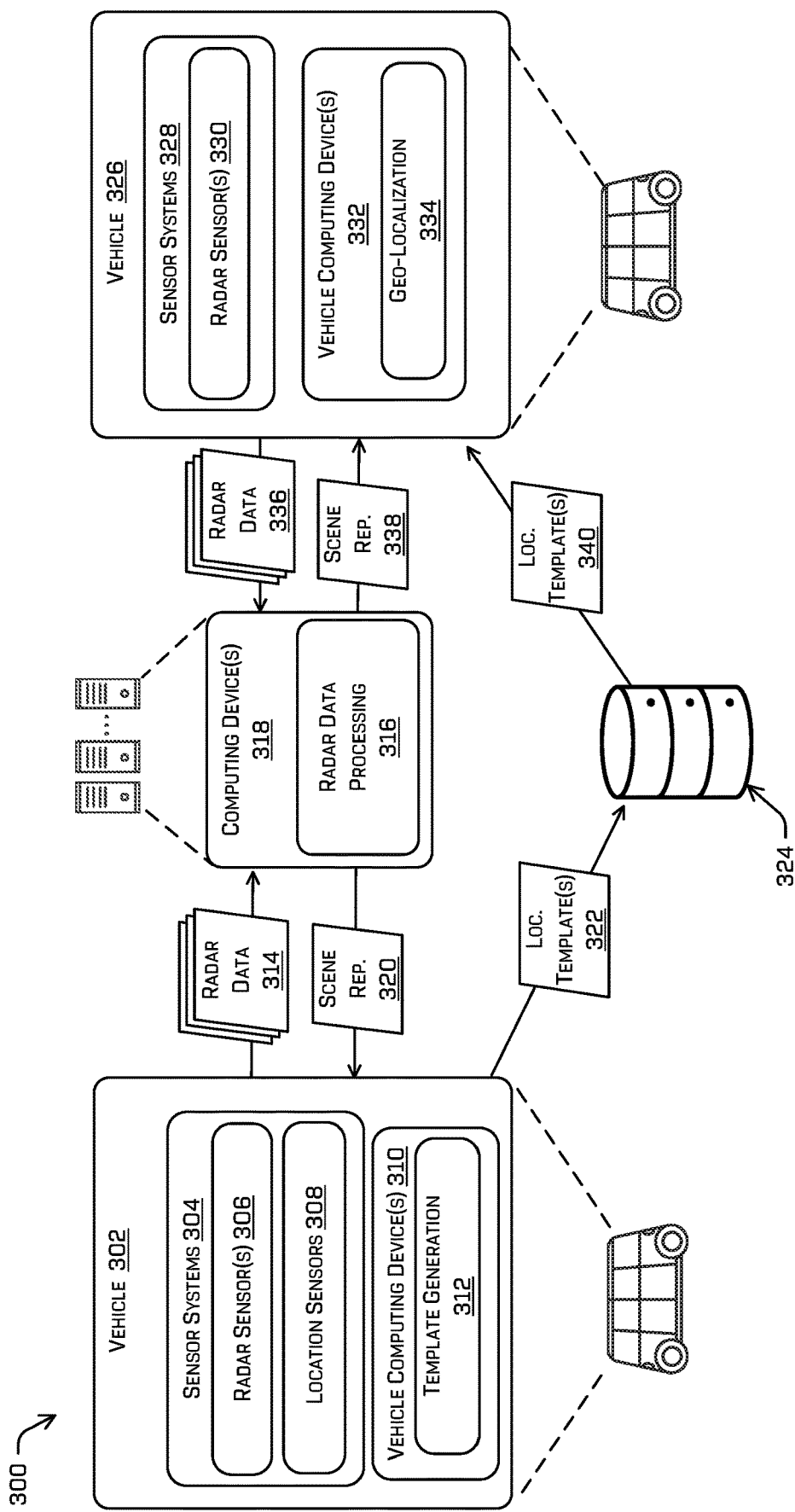
FIG. 3 is a functional block diagram illustrating an example system for generating a library of localization templates and determining geo-location of a vehicle by using the pre-generated library, in accordance with embodiments of the disclosure.

FIG. 3 is a functional block diagram illustrating aspects of an example process 300 for determining geo-location, including pre-generating a library of localization templates, in accordance with embodiments of the disclosure. In some embodiments, the process 300 may include one or multiple features, components, and/or functionality of embodiments described herein with reference to FIGS. 1 and 2.

In examples, the process 300 may include a vehicle 302, which may collect data (e.g., a data-collector vehicle) for generating a localization template library. As the vehicle 302 traverses an environment, sensor systems 304 of the vehicle 302 may capture sensor data, such as radar data. For example, radar system(s) 306, which may comprise radar systems, such as 4D radar systems, and/or LiDAR systems, may capture radar data (e.g., 3D point clouds) of the environment, and location sensors 308, which may be a GPS unit, may capture geo-location corresponding to the captured sensor data. In some examples, the location sensors 308 may be replaced or supplemented by other geo-location generation mechanisms, such as feature matching in sensor data, manual input, using cellular base station IDs, Wi-Fi positioning systems, Bluetooth beacons, and the like.

In examples, vehicle computing device(s) 310 of the vehicle 302 may implement a template generation component 312. The template generation component 312 may be configured to provide radar data 314 captured by the radar system(s) 306 as input to a radar data processing component 316, which may be implemented on computing device(s) 318. Though, the computing device(s) 318 implementing the radar data processing component 316 are shown as external to the vehicle 302 e.g., accessible via a network connection, in other examples, the radar data processing component 316 may be implemented by the vehicle computing device(s) 310 instead, and its functions performed on-board the vehicle 302.

The radar data processing component 316 may implement functionality of the filtering component 158, and the representation generation component 158, to generate a scene representation 320 as output, which may be the same as the scene representation 160 or the representation 208. The sensor systems 304 may capture the radar data 314 and its corresponding geo-location at pre-determined intervals as the vehicle 302 traverses the environment. The template generation component 312 may provide the captured radar data 314 to the radar data processing component 316 and receive the corresponding scene representations 320.

The template generation component 312 may store the scene representations 320 along with the associated geo-locations, as determined by the location sensors 308, as localization template(s) 322. The template generation component 312 may store the localization templates 322 in a memory 324, which may be external to the vehicle 302, and accessible via a communication network. For example, the storage memory 324 may be implemented on a database server. In some examples, the radar data 314, or a compressed version of the radar data 314, may also be stored in the storage memory 324, for use in re-generating the localization template(s) 322 using different parameters or techniques in future, or for processing the radar data 314 using domain adaptation techniques to make the data compatible with a different make/model of radar sensor(s) than the radar sensor(s) 306.

As also illustrated in FIG. 3, a vehicle 326, which may be a vehicle similar to the vehicle 302 (e.g., of similar make/model and equipped with similar sensors mounted in corresponding locations to the vehicle 302) may utilize the localization templates 322 stored in the memory 324. Without limitation, the vehicle 326 may be the vehicle 102 discussed above. For example, sensor systems 328 of the vehicle 326, such as radar sensor(s) 330, may capture radar data 336 of a scene in an environment the vehicle 326 is operating in. Vehicle computing device(s) 332 may implement a geo-localization component 334, which may include functionality of the geo-localization component 162, configured to provide as an input, the radar data 336 to the radar data processing component 316. In some examples, the radar sensor(s) 330 of the vehicle 326 may not be identical to the radar sensor(s) 306 of the vehicle 302 (e.g., the radar sensor(s) 330 may be of a different make or model from the radar sensor(s) 306). In such examples, the radar data 336 (or a 3D point cloud corresponding to the radar data 336) may be processed to adjust for differences between the radar sensor(s) 306, 330 by using domain adaptation techniques, before being provided as input to the radar data processing component 316. It is to be noted that the radar data processing component 316 processes both the radar data 314 from the data-collector vehicle 302 and the radar data 336 from the operational vehicle 326 using the same steps, and in particular, using the same set of basis vectors during the dimensionality reduction process. Though, the radar data processing component 316 is shown as being implemented on an external computing device(s) 318 e.g., accessible via a network connection, in other examples, the radar data processing component 316 may be implemented by the vehicle computing device(s) 332 instead, and its functions performed on-board the vehicle 326.

The geo-localization component 334 may receive a scene representation 338 as an output from the radar data processing component 316. The geo-localization component 334 may compare the scene representation 338 with localization template(s) 340 from the memory 324. As described with reference to FIGS. 1 and 2, the localization template(s) 340 may be a subset of the localization templates stored in the memory 324, where the subset may be based on a threshold radius of a last-known geo-location or a predicted current geo-location of the vehicle 326. Further, the geo-localization component 334 may determine a matching localization component among the localization template(s) 340, as described with reference to the operation 210 of FIG. 2, and generate as its output, the geo-location associated with the matching localization component.

Figure 4:
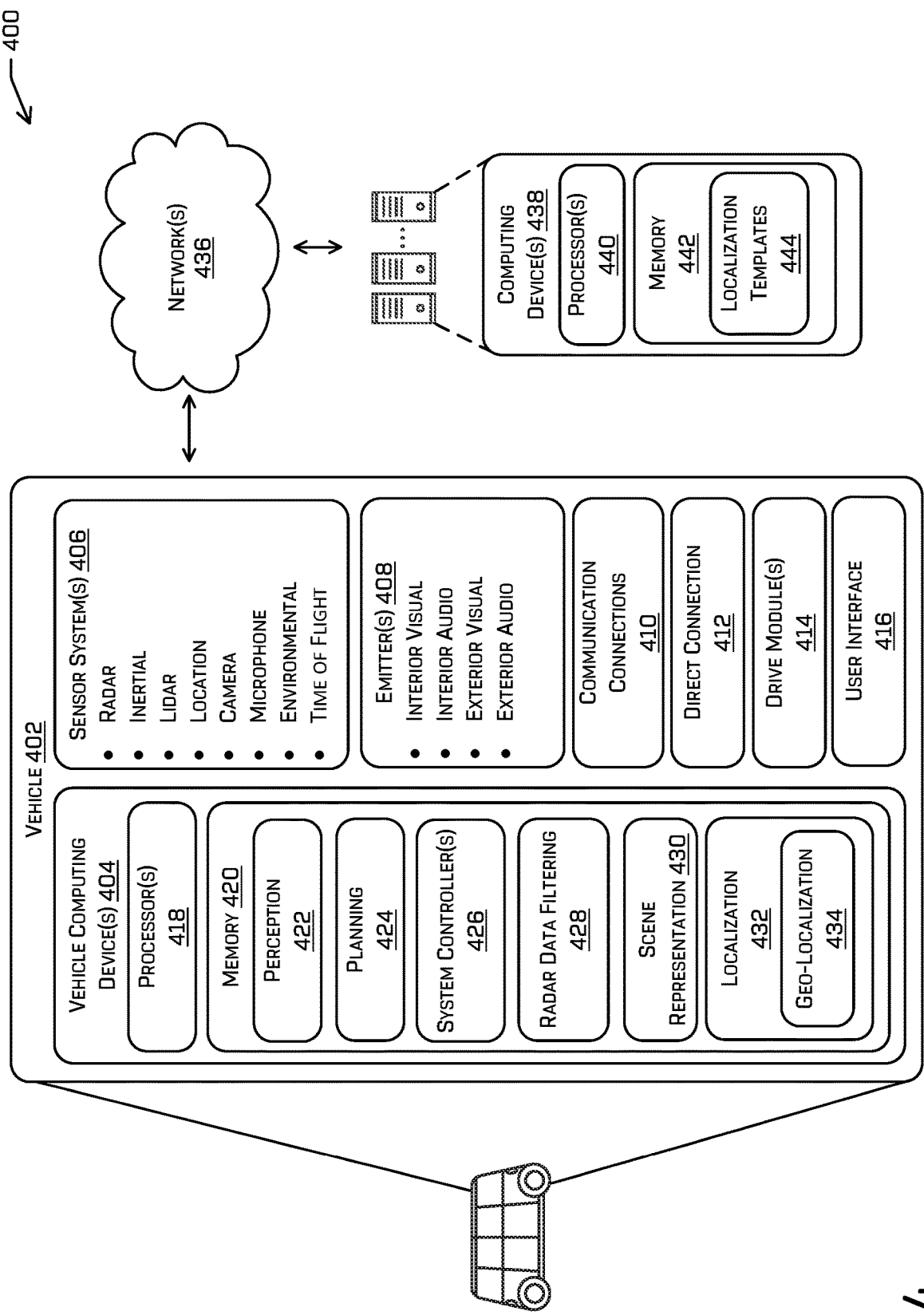
FIG. 4 is a block diagram illustrating an example computing system for implementing the techniques described herein.

FIG. 4 is a block diagram of an example system 400 for implementing the techniques described herein. In at least one example, the system 400 can include a vehicle 402, which can be the same vehicle as the vehicle 102, described above with reference to FIG. 1. The vehicle 402 can include one or more vehicle computing devices 404, one or more sensor systems 406, one or more emitters 408, one or more communication connections 410, at least one direct connection 412, one or more drive modules 414, and a user interface 416.

The vehicle computing device(s) 404 can include one or more processors 418 and memory 420 communicatively coupled with the one or more processors 418. In the illustrated example, the vehicle 402 is an autonomous vehicle; however, the vehicle 402 could be any other type of vehicle. In the illustrated example, the memory 420 of the vehicle computing device 404 stores a perception component 422, a planning component 424, one or more system controllers 426, a radar data filtering component 428, a scene representation component 430, and a localization component 432, which includes a geo-localization component 434, as described herein. Though depicted in FIG. 4 as residing in the memory 420 for illustrative purposes, it is contemplated that the perception component 422, the planning component 424, the one or more system controllers 426, the radar data filtering component 428, the scene representation component 430, and/or the localization component 432, can additionally, or alternatively, be accessible to the vehicle 402 (e.g., stored on, or otherwise accessible by, memory remote from the vehicle 402).

In at least one example, the vehicle 402 may be in communication, via one or more network(s) 436, with one or more computing device(s) 438. For example, as described herein, the vehicle 402 can communicate with the one or more computing device(s) 438, which may be remote from the vehicle 402, via the network(s) 436. In some examples, the vehicle 402 can receive control signals from the computing device(s) 438. In other examples, the vehicle 402 can transmit information to the computing device(s) 438. The computing device(s) 438 may be embodied as a fleet management system. In at least one example, the computing device(s) 438 can include processor(s) 440 and memory 442 communicatively coupled with the processor(s) 440.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. In some examples, the perception component 422 may associate a bounding box (or other indication of segmentation) with an identified entity and may associate a confidence score with a classification of the identified entity. Characteristics associated with the environment can include, but are not limited to, a presence of another entity in the environment, a state of another entity in the environment, a time of day, a day of a week, a season, a weather condition, an indication of darkness/light, etc. By way of non-limiting example, the processed sensor data generated by the perception component 422, including indications of entities in the environment and their corresponding classification and characteristics, may be used by the radar data filtering component 428 to filter out data corresponding to transient elements in the environment.

The planning component 424 can determine a path for the vehicle 402 to follow to traverse through an environment. The planning component 424 can determine various routes and trajectories at various levels of detail. For example, the planning component 424 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive module(s) 414 and/or other components of the vehicle 402.

The radar data filtering component 428 can be the filtering component 156 detailed above with reference to FIG. 1. Generally, the radar filtering component 428 can include functionality to receive radar data of a scene, such as data from 4D radar sensors or LiDAR sensors, and filter out portions of the radar data that correspond to transient elements in the scene. For instance, the radar filtering component 428 may filter out the portions of the radar data corresponding to moving objects (e.g., moving vehicles, walking pedestrians, bicyclists, and the like), temporary objects (e.g., parked vehicles, stationary pedestrians and cyclists, and the like), and/or blobs of points determined as likely to be noise. As described above with reference to FIG. 1, the radar filtering component 428 may use machine learning techniques to determine the transient elements in the radar data. In some examples, the radar data filtering component 428 may use the processed sensor data generated by the perception component 422 that includes classification and characteristics of entities in the environment of the vehicle, to determine the transient elements and corresponding data points. The radar data filtering component 428 may also determine modality of sensors to use based on characteristics of the environment generated by the perception component 422. For instance, if the characteristics of the environment indicate poor visibility and/or precipitation, data from 4D sensors may be preferred over LiDAR sensors. The radar filtering component 428 may output filtered radar data corresponding to the scene after removal of blobs of points corresponding to the transient elements.

The scene representation component 430 can include functionality to receive filtered radar data from the radar data filtering component 428, and generate an efficient representation of the scene from the radar data, e.g., the scene representation component 430 can be the representation generation component 158 and generate the scene representation 160. For example, the scene representation component 430 may project the high-dimensional radar data on a low-dimensional subspace, thereby significantly reducing data storage and processing time requirements. In an example implementation, the radar data may be projected onto a set of random basis vectors using the JLT technique, which preserves pairwise distances with high probability. In some examples, the radar data may be projected on a plurality of sets of random basis vectors, the plurality generating a representation that is less ambiguous (e.g., less likely to produce erroneous matches). Each scene representation may comprise a vector of much smaller dimensionality than the original radar data.

In at least one example, the localization component 432 can include functionality to receive data from the sensor system(s) 406 to determine a position and/or orientation of the vehicle 402 (e.g., one or more of an x-, y-, z-position, roll, pitch, or yaw). For example, the localization component 432 can include and/or request/receive a map of an environment and can continuously determine a location and/or orientation of the autonomous vehicle within the map. In some instances, the localization component 432 can utilize SLAM (simultaneous localization and mapping), calibration, localization and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle.

In some instances, the localization component 432 can include the geo-localization component 434 to determine a geo-location (e.g., latitude/longitude and/or position on a map) of the vehicle 402 based on the data from the sensor system(s) 406, as discussed herein. The geo-localization component 434 may be the geo-localization component 162. The operations 210, 218 demonstrate example functionality of the geo-localization component 434. For example, the geo-localization component 434 may compare the scene representation generated by the scene representation component 430 with previously-generated and stored localization templates to determine a matching localization template. In the illustrated example, the memory 442 of the computing device(s) 438 stores localization templates 444 to be used by the geo-localization component 434 for comparing with the scene representation. In some examples, a subset of the localization templates 444 may be transmitted over the network(s) 436 and stored in the memory 420 for faster access. The subset of the localization templates 444 may be selected based on proximity to a previously-determined geo-location of the vehicle 402, and its general direction and speed of motion. For example, the subset may include the localization templates corresponding to geo-locations within a threshold radius of a current, previous, or predicted geo-location of the vehicle 402.

Although shown separate from other components for clarity and ease of reference, functionality of the radar data filtering component 428, the scene representation component 430, and/or the geo-localization component 434 may be performed by other aspects of the vehicle 402. Without limitation, one or more of those components may be incorporated into the perception component 422. Aspects of this disclosure provide improved functionality resulting at least in part from use of an efficient representation of sensor data corresponding to a scene, regardless of the module, component, or system using that data according to the techniques detailed herein.

In at least one example, the sensor system(s) 406 can include the 4D radar sensors described herein. Also in examples, the sensor system(s) 406 can include LiDAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, and as discussed herein, implementations of this disclosure may use multiple sensors to capture a 360-degree field-of-view around the autonomous vehicle 402. For example, the 4D radar sensors and/or the LiDAR sensors can include individual sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 436, to the one or more computing device(s) at a particular frequency, after a lapse of a predetermined period of time, in near real-time, etc.

The emitter(s) 408 may be configured to emit light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 402. The emitter(s) 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote controllers.

The communications connection(s) 410 can include physical and/or logical interfaces for connecting the vehicle computing device 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 402 can include the drive module(s) 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 414. In some cases, the sensor system(s) 406 on the drive module(s) 414 can overlap or supplement corresponding systems of the vehicle 402 (e.g., the sensor system(s) 406).

The drive module(s) 414 can include many vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) 406 and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 can provide a physical interface to couple the one or more drive module(s) 414 with the body of the vehicle 402. For example, the direction connection 412 can allow the transfer of energy, fluids, air, data, etc. between the drive module(s) 414 and the vehicle. In some instances, the direct connection 412 can further releasably secure the drive module(s) 414 to the body of the vehicle 402.

The user interface 416 may include one or more devices, buttons and/or control panels via which a passenger can communicate with the vehicle 402. In non-limiting examples, a passenger in the vehicle 402 may control functionality of the vehicle 402 via interaction(s) with the user interface 416. In other examples, the user interface 416 may comprise a microphone configured to receive a verbal or spoken input. Generally, the user interface 416 may provide a means though which a passenger can interface with the vehicle computing device(s) 404. In some examples, the user interface 416 may display or indicate the geo-location determined by the geo-localization component 434 using the techniques described herein.

In some instances, aspects of some or all of the components discussed herein can include any models, algorithms, and/or machine learning algorithms. For example, in some instances, aspects of the components in the memory 420, 442 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). Additional examples of architectures include neural networks such as ResNet50, ResNet101, VGG, DenseNet, PointNet, and the like. As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Figure 5:
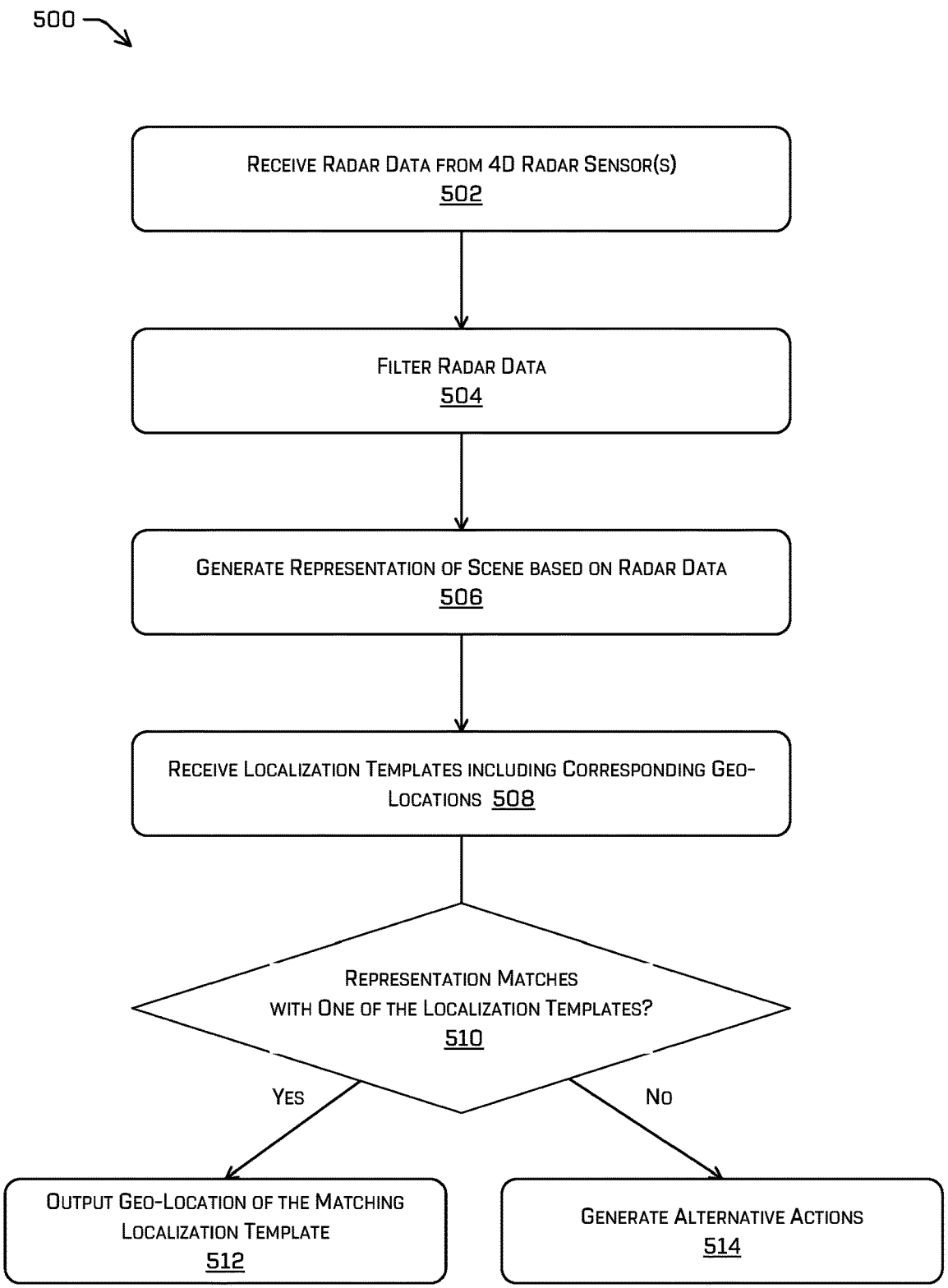
FIG. 5 illustrates an example process for determining geo-location of a vehicle, such as an autonomous vehicle, based on performing geo-localization, as described herein.
Figure 6:
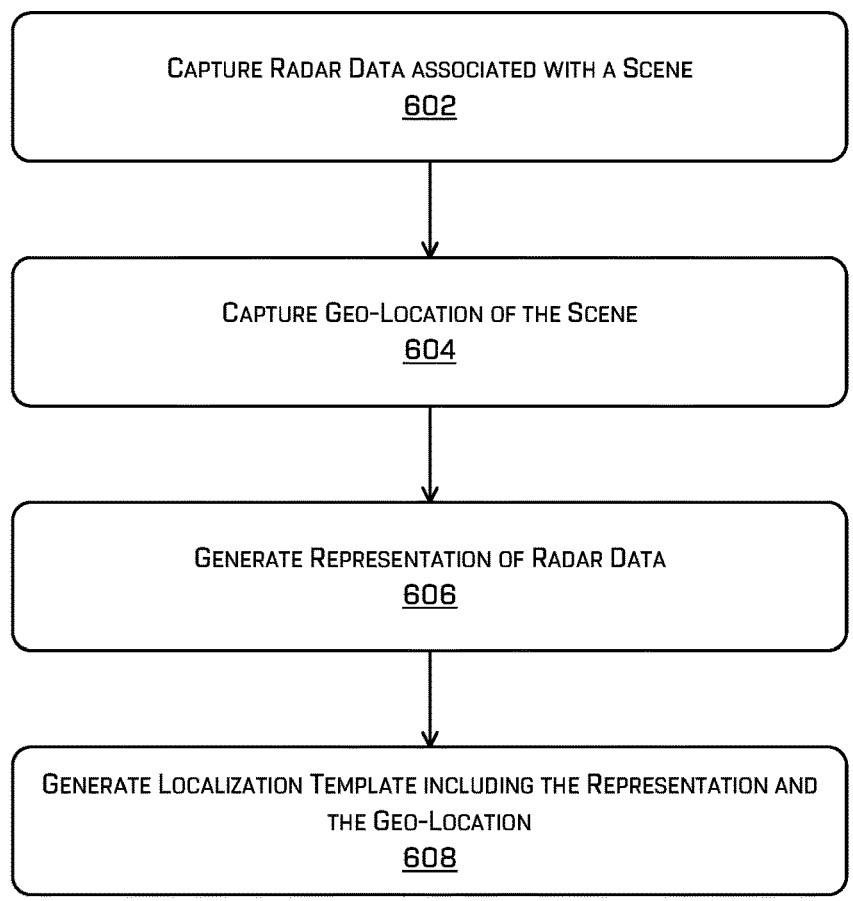
FIG. 6 illustrates an example process for generating localization templates for use in determining geo-location of a vehicle, such as an autonomous vehicle, as described herein.

FIG. 5 depicts an example process 500 for determining geo-location of a vehicle using sensor data, such as radar data or LiDAR data. FIG. 5 and FIG. 6, discussed below, illustrate processes as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some or all of the process 500 can be performed by one or more components in FIG. 4, as described herein. Without limitation, some or all of the process 500 can be performed by the radar data filtering component 428, the scene representation component 430, and/or the geo-localization component 434. Although discussed in the context of an autonomous vehicle, the process 500, and the techniques and systems described herein, can be applied to a variety of systems utilizing sensors.

At an operation 502, the process 500 includes receiving radar data from one or more radar sensors. As described above, the vehicle 102 includes the radar sensors 116*a*, 116*b*, the vehicle 302 includes the radar sensor(s) 306, the vehicle 326 includes the radar sensor(s) 330, and the vehicle 402 includes the sensor system(s) 406 that can include including a plurality of radar sensors having a 360-degree field-of-view of an environment of the respective vehicles. The radar data may comprise a three-dimensional point cloud of a scene of the environment, and can include one or more additional information, such as signal strength (e.g., an RCS measurement), signal-to-noise ratio (SNR), velocity information (e.g., a doppler velocity), or the like. As described above, the radar data is high-dimensional e.g., the data can be represented by vector $x \in \mathbb{R}^{3pqr}$ where the 3D point cloud is of size (p, q, r) along x-, y-, and z-axes respectively.

At an operation 504, the process 500 includes filtering the radar data to remove data points corresponding to transient elements of the scene. generating a representation of one or more objects based on the radar data. Examples of transient elements may include moving objects, such as other moving vehicles, pedestrians, bicycles, and the like, as well as temporarily motionless objects e.g., parked cars and bicycles, a standing person, and the like. Transient elements may also include noise in the data. The filtering component 156 or the radar data filtering component 428 include functionality to identify, from the radar data received at the operation 502, transient elements. In some examples, the filtering component 156 or the radar data filtering component 428 can include one or more trained machine learning models and/or other data processing models that receive the radar data as an input and outputs points corresponding to transient elements in the data. The operation 504 may include removing the points corresponding to the transient elements to generate filtered radar data, which is of the same dimensionality as the radar data.

At an operation 506, the process 500 includes generating a representation of the filtered radar data, the representation representing time-invariant elements of the scene. As described above, the representation may be a low-dimensional representation of the high-dimensional filtered radar data e.g., comprising a vector $x \in \mathbb{R}^d$, where d<<pqr. Without limitation, the representation may be generated by applying a dimensionality reduction technique, such as a Johnson-Lindenstrauss Transform (JLT), on the filtered radar data e.g., as an output of the representation generation component 158, the radar data processing component 316, or the scene representation component 430, and may be one of the scene representations 160, 320, or 338. In some examples, the representation may include projection vectors corresponding to multiple applications of the dimensionality reduction technique, each described by a unique set of basis vectors, as detailed herein.

At an operation 508, the process 500 includes receiving localization templates, each including associated geo-location. In implementations described herein, a data-collector vehicle, such as the vehicle 302, may generate and store localization templates and their associated geo-locations in a memory accessible to a vehicle implementing the process 500. As described herein, the operation 508 may receive a subset of the localization templates stored in the memory, such as the memory 324, 442. The subset may include only the localization templates associated with geo-locations that fall within a threshold radius of a target geo-location e.g., a last-known geo-location, an approximate geo-location from a GPS unit, or a predicted geo-location of the vehicle. As also described herein, the localization templates are generated using the same processing steps as described with reference to generation of the representation e.g., by the radar data processing component 316.

At an operation 510, the process 500 includes determining whether the representation matches with one of the localization templates. For instance, the operation 510 can determine a distance between the representation generated at the operation 506 and each of the localization templates received at the operation 508. Without limitation, the distance can be a cosine similarity between vector(s) describing the representation and vector(s) describing a localization template. The operation 510 may determine a matching localization template, based on a distance between the representation and the matching localization template being the smallest among the localization templates (e.g., using a nearest-neighbor search technique), and/or based on the distance being less than a threshold. If it is determined that the representation matches (at 510—Yes) with one of the localization templates e.g., the matching localization template, the process 500 may output a geo-location associated with the matching localization template at an operation 512, as a current geo-location of the vehicle implementing the process 500.

Alternatively, if at the operation 510 it is determined that none of the localization templates match the representation (at 510-No), at an operation 514, the process 500 may generate alternative actions. As described with reference to functionality of the geo-localization component 162 of FIG. 1, the alternative actions may include one or more of repeating the operations 502-510 of the process 500 for a threshold amount of time, receiving additional localization templates and repeating the operation 510, or using alternative techniques for geo-localization and/or navigation. In some examples, the operation 514 may generate an action to save the representation for which no match was found at the operation 510, along with associated data in a log file, for potential addition to a localization template library and/or for debugging errors which may have caused the inability to match at the operation 510.

FIG. 6 depicts an example process 600 for generating a localization template, based at least in part on radar data, to be stored in a library of localization templates for geo-localizing an autonomous vehicle, as discussed herein. For example, some or all of the process 600 can be performed by systems and components of the vehicle 302, or one or more components in FIG. 4, as described herein. For example, some or all of the process 600 can be performed by the radar data processing component 316, the template generation component 312, the radar filtering component 428, and/or the scene representation generation component 430.

At an operation 602, the process 600 can include capturing radar data associated with a scene in an environment an autonomous vehicle is traversing. In examples, the radar data may be captured by the radar sensors 116a, 116b of the vehicle 102. In some examples, the radar data may additionally or alternatively be captured by the LiDAR sensors 122a, 122b of the vehicle 102. As described above, the radar data may comprise a three-dimensional point cloud of high dimensionality.

At an operation 604, the process 600 includes capturing geo-location of the scene where the radar data is captured at the operation 602. For example, the geo-location may be captured by the location sensors 308 using instrumentation (e.g., a GPS unit), or by other methods e.g., using cellular base station IDs, Wi-Fi positioning systems, Bluetooth beacons, manual tagging, and the like, as described above with reference to FIG. 3.

At an operation 606, the process 600 can include generating a low-dimensional representation of the radar data captured at the operation 602. For example, the operation 606 may be implemented in the representation generation component 158, the radar data processing component 316, and/or the scene representation component 430. At the operation 606, the process 600 may generate the representation by applying a dimensionality reduction technique on the radar data captured at the operation 602. In some examples, the radar data may be also be filtered to remove transient elements, as described above with respect to FIG. 5, and the process 600 may apply the dimensionality reduction technique to the filtered radar data to generate the representation. As described above, and without limitation, the dimensionality reduction technique may comprise applying a Johnson-Lindenstrauss Transform (JLT), to determine projections of the radar data or the filtered radar data on a lower dimensional space described by a set of random basis vectors. In some examples, the representation may include projection vectors corresponding to multiple applications of the dimensionality reduction technique, each described by a unique set of basis vectors, as detailed herein. In implementations of this disclosure, the same set of basis vectors is used for generating the representation at the operation 506 of FIG. 5 and at the operation 606, such that a representation of a scene at the operation 506 is likely to be similar to the representation of the same scene at the operation 606 e.g., produce a match.

At operation 608, the process 600 can include saving a localization template, including the representation generated at the operation 606 and the geo-location of the scene captured at the operation 604. As described above, the localization template may be stored e.g., in a database server, and be utilized for geo-localization by vehicles traversing the same scene at a future time using the techniques described herein. In examples, the localization templates may be stored in a database that is indexed by the associated geo-locations, such that a subset of the localization templates within a threshold radius of a given geo-location can be efficiently extracted e.g., as utilized by the geo-localization component 162, 334, 434 for geo-localization of the vehicle.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example autonomous vehicle includes: a four-dimensional (4D) radar sensor coupled to the autonomous vehicle; one or more processors; and one or more non-transitory computer readable media storing instructions executable by the one or more processors, wherein the instructions, when executed, cause the autonomous vehicle to perform operations comprising: receiving, from the 4D radar sensor, radar data comprising a set of points representative of an environment of the autonomous vehicle; identifying a subset of the set of points associated with transient elements in the environment; generating filtered radar data excluding the subset of the set of points, the filtered radar data being characterized by a first dimensionality; receiving a set of localization templates, individual of the set of localization templates being associated with a corresponding geo-location and being characterized by the second dimensionality; determining, based on a similarity between the representation and individual of the set of localization templates, a matching localization template; and determining, based on the corresponding geo-location associated with the matching localization template, a geo-location of the autonomous vehicle.

B: The autonomous vehicle of example A, wherein the transient elements include one or more of: a moving object, a temporarily static object, or a noise blob.

C: The autonomous vehicle of example A or example B, wherein generating the representation comprises applying a Johnson-Lindenstrauss Transform on the filtered radar data.

D: The autonomous vehicle of any one of example A through example C, wherein determining the matching localization template is based on a distance between the representation and the matching localization template being the smallest among distances between the representation and the individual of the localization templates of the set of localization templates.

E: The autonomous vehicle of any one of example A through example D, wherein the similarity between the representation and a localization template comprises a cosine similarity between the representation and the localization template.

F: The autonomous vehicle of any one of example A through example E, wherein the geo-locations associated with the set of localization templates is within a threshold radius of a last-known geo-location of the autonomous vehicle, an approximate geo-location, operational confines, a planned route, or a predicted geo-location of the autonomous vehicle.

G: An example method includes: receiving sensor data associated with an environment, the sensor data being characterized by a first dimensionality; generating, a representation of the sensor data, the representation being characterized by a second dimensionality lower than the first dimensionality; comparing the representation to one or more localization templates, individual of the one or more localization templates including an associated geo-location; determining, based on comparing, a matching localization template from among the one or more localization templates; and determining a current geo-location in the environment based on the geo-location associated with the matching localization template.

H: The method of example G, wherein a modality of the sensor data is determined based on a confidence score associated with the modality.

I: The method of example G or example H, wherein the sensor data comprises a radar point cloud or a LiDAR point cloud.

J: The method of any one of example G through example I, further comprising: identifying a subset of points in the point cloud associated with transient objects in the environment; and generating, by removal of the subset of points from the point cloud, a filtered point cloud, wherein generating the representation comprises a projection of the filtered point cloud on a low-dimensional subspace.

K: The method of any one of example G through example J, wherein the subset of points is identified using a machine learned model trained to identify points associated with transient objects.

L: The method of any one of example G through example K, wherein: individual of the localization templates comprises projections of high-dimensional data on one or more low-dimensional subspaces, and generating the representation comprises projecting the sensor data on the one or more low-dimensional subspaces.

M: The method of any one of example G through example L, wherein individual ones of the one or more low-dimensional subspaces are characterized by a set of random basis vectors.

N: The method of any one of example G through example M, further comprising: determining a first subset of the one or more localization templates, wherein the geo-locations associated with the first subset are within a first radius of a target geo-location; and determining a distance between the representation and individual of the first subset, wherein determining the matching localization template is based at least in part on the distance.

O: The method of any one of example G through example N, further comprising: determining, based on the distance between the representation and individual localization templates of the first subset being greater than a threshold distance, an absence of a match; and determining, based on the absence of a match, a second subset of localization templates, wherein: the geo-locations associated with the second subset are within a second radius of the target geo-location, the second radius being greater than the first radius, and determining the matching localization template is based at least in part on distances between the representation and individual localization templates of the second subset.

P: An example non-transitory computer readable media storing instructions that, when executed by one or more processors, cause the processors to perform operations comprising: receiving radar data associated with an environment, the radar data characterized by a first dimensionality; generating, based on applying dimensionality reduction to the radar data, a representation of the radar data, the representation characterized by a second dimensionality less than the first dimensionality; receiving a plurality of localization templates, individual of the plurality of localization templates including an associated geo-location; determining, based on a distance to the representation, whether a localization template of the plurality of localization templates matches the representation; and determining, based on a localization template of the plurality of localization templates matching the representation, that a current geo-location is the geo-location associated with the localization template.

Q: The non-transitory computer readable media of example P, wherein: the radar data is captured by 4D radar sensors, and the dimensionality reduction is based on application of Johnson-Lindenstrauss Transform.

R: The non-transitory computer readable media of example P or example Q, the operations further comprising: determining a subset of the radar data corresponding to permanent objects in the environment, wherein the representation is based on applying dimensionality reduction to the subset of the radar data.

S: The non-transitory computer readable media of any one of example P through example R, wherein: determining that a localization template of the plurality of localization templates matches the representation is based on the distance to the representation being a minimum of distances between individual of the plurality of localization templates and the representation, and the minimum of distances being equal to or less than a threshold.

T: The non-transitory computer readable media of any one of example P through example S, wherein the radar data is first radar data captured at a first time, the operations further comprising: determining, based on the minimum of distances being greater than the threshold, an absence of a match; and receiving, based on determining the absence of a match, second radar data captured at a second time after the first time, wherein generating the representation is based on the second radar data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:
1. An autonomous vehicle comprising:
   a four-dimensional (4D) radar sensor coupled to the autonomous vehicle;
   one or more processors; and
   one or more non-transitory computer readable media storing instructions executable by the one or more processors, wherein the instructions, when executed, cause the autonomous vehicle to perform operations comprising:
      receiving, from the 4D radar sensor, radar data comprising a set of points representative of an environment of the autonomous vehicle;
      identifying a subset of the set of points associated with transient elements in the environment;
      generating filtered radar data excluding the subset of the set of points, the filtered radar data being characterized by a first dimensionality;
      generating a representation of the filtered radar data, the representation characterized by a second dimensionality lower than the first dimensionality;
      receiving a set of localization templates, individual of the set of localization templates being associated with a corresponding geo-location and being characterized by the second dimensionality;
determining a subset of the set of localization templates, wherein the geo-locations associated with the subset of the set of localization templates are within a threshold radius of a target geo-location;
determining, based on a similarity between the representation and individual localization template of the subset of the set of localization templates, a matching localization template; and
determining, based on the corresponding geo-location associated with the matching localization template, a geo-location of the autonomous vehicle.

2. The autonomous vehicle of claim 1, wherein the transient elements include one or more of: a moving object, a temporarily static object, or a noise blob.

3. The autonomous vehicle of claim 1, wherein generating the representation comprises applying a Johnson-Lindenstrauss Transform on the filtered radar data.

4. The autonomous vehicle of claim 1, wherein determining the matching localization template is based on a distance between the representation and the matching localization template being smallest among distances between the representation and the individual localization template of the subset of the set of localization templates.

5. The autonomous vehicle of claim 1, wherein the similarity comprises a cosine similarity between the representation and the individual localization template of the subset of the set of localization templates.

6. The autonomous vehicle of claim 1, wherein the target geo-location comprises one or more of:
a last-known geo-location of the autonomous vehicle,
an approximate geo-location of the autonomous vehicle,
operational confines of the autonomous vehicle,
a planned route of the autonomous vehicle, or
a predicted geo-location of the autonomous vehicle.

7. A method comprising:
receiving sensor data associated with an environment being traversed by a vehicle, the sensor data being characterized by a first dimensionality;
generating, a representation of the sensor data, the representation being characterized by a second dimensionality lower than the first dimensionality;
receiving one or more localization templates, individual of the one or more localization templates including an associated geo-location;
determining a first subset of the one or more localization templates having geo-locations within a first radius of a target geo-location;
determining a distance between the representation and individual localization templates of the first subset;
determining, based on the distance, a matching localization template from among the first subset; and
determining a current geo-location of the vehicle in the environment based on the geo-location associated with the matching localization template.

8. The method of claim 7, wherein the sensor data comprises a radar point cloud or a LiDAR point cloud captured by a sensor coupled to the vehicle, and
a modality of the sensor data is determined based on a confidence score associated with the modality.

9. The method of claim 8, further comprising:
identifying a subset of points in the point cloud associated with transient objects in the environment; and
generating, by removal of the subset of points from the point cloud, a filtered point cloud,
wherein generating the representation comprises a projection of the filtered point cloud on a low-dimensional subspace.

10. The method of claim 9, wherein the subset of points is identified using a machine learned model trained to identify points associated with transient objects.

11. The method of claim 7, wherein:
individual of the localization templates comprises projections of high-dimensional data on one or more low-dimensional subspaces, and
generating the representation comprises projecting the sensor data on the one or more low-dimensional subspaces.

12. The method of claim 11, wherein individual ones of the one or more low-dimensional subspaces are characterized by a set of random basis vectors.

13. The method of claim 7,
wherein determining the matching localization template is based at least in part on the distance between the representation and the matching localization template being smallest among distances between the representation and the individual localization templates of the first subset.

14. The method of claim 13, further comprising:
determining, based on the distance between the representation and the individual localization templates of the first subset being greater than a threshold distance, an absence of a match; and
determining, based on the absence of a match, a second subset of localization templates, wherein:
the geo-locations associated with the second subset are within a second radius of the target geo-location, the second radius being greater than the first radius, and
determining the matching localization template is based at least in part on distances between the representation and individual localization templates of the second subset.

15. The method of claim 7, wherein the target geo-location comprises one or more of:
a last-known geo-location of the vehicle,
an approximate geo-location of the vehicle,
an operational geo-fence of the vehicle, or
a planned route of the vehicle.

16. Non-transitory computer readable media storing instructions that, when executed by one or more processors, cause the processors to perform operations comprising:
receiving radar data associated with an environment being traversed by a vehicle, the radar data characterized by a first dimensionality;
generating, based on applying dimensionality reduction to the radar data, a representation of the radar data, the representation characterized by a second dimensionality less than the first dimensionality;
receiving a plurality of localization templates, individual of the plurality of localization templates including an associated geo-location;
determining a subset of the plurality of localization templates having geo-locations within a threshold radius of a target geo-location;
determining, based on a distance between the representation and a localization template of the subset, that the localization template of the subset matches the representation; and
based on determining that the localization template of the subset matches the representation, determining that a current geo-location of the vehicle is the geo-location associated with the localization template of the subset.

17. The non-transitory computer readable media of claim 16, wherein:
   the radar data is captured by 4D radar sensors, and
   the dimensionality reduction is based on application of Johnson-Lindenstrauss Transform.

18. The non-transitory computer readable media of claim 16, wherein the operations further comprise:
   determining a subset of the radar data corresponding to permanent objects in the environment,
   wherein the representation is based on applying dimensionality reduction to the subset of the radar data.

19. The non-transitory computer readable media of claim 16, wherein:
   determining that the localization template of the subset matches the representation is based on the distance to the representation being a minimum of distances between individual of localization templates of the subset and the representation, and
   the minimum of distances is equal to or less than a threshold.

20. The non-transitory computer readable media of claim 19, wherein the radar data is first radar data captured at a first time, the operations further comprising:
   determining, based on the minimum of distances being greater than the threshold, an absence of a match; and
   receiving, based on determining the absence of a match, second radar data captured at a second time after the first time,
   wherein generating the representation is based on the second radar data.

* * * * *